UNITED STATES PATENT OFFICE.

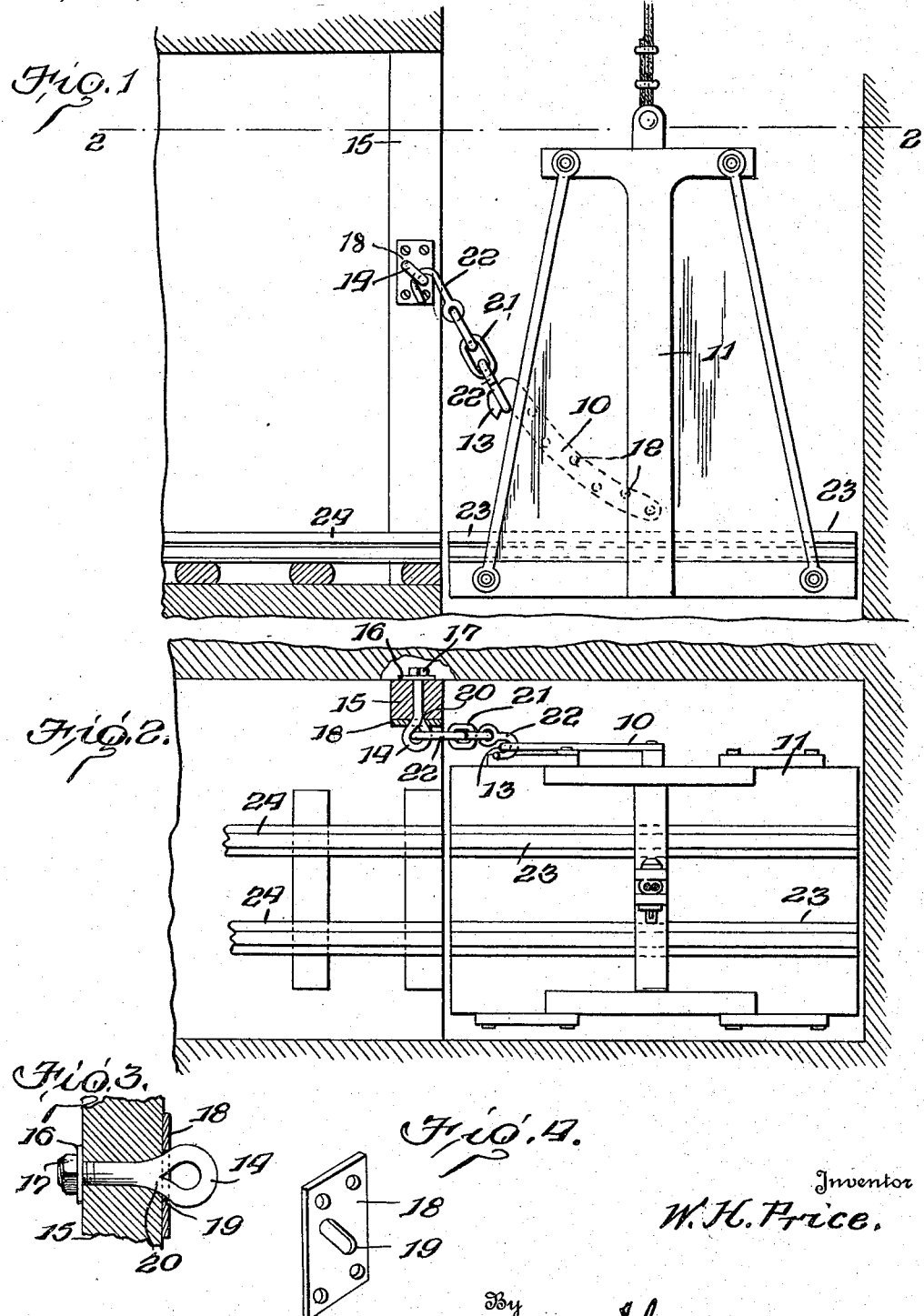

WILLIAM H. PRICE, OF BUTTE, MONTANA.

DEVICE FOR HOLDING MINE-CAGES.

1,215,409.

Specification of Letters Patent.

Patented Feb. 13, 1917.

Application filed August 15, 1916. Serial No. 115,047.

*To all whom it may concern:*

Be it known that I, WILLIAM H. PRICE, a citizen of the United States, residing at Butte, in the county of Silverbow and State of Montana, have invented certain new and useful Improvements in Devices for Holding Mine-Cages, of which the following is a specification.

This invention relates to attachments for mine cages and for like purposes, as a safety device to prevent mine cages from accidentally dropping or being displaced while in use.

Another object of the invention is to provide a simply constructed device which will effectually hold the cage in position while being loaded or unloaded, and will hold the cage in the same position regardless of the strain upon the hoisting cable.

Another object of the invention is to provide a simply constructed device which will not interfere with the ordinary operations of the cage or other parts of the shaft, and which will not project into the path of the cage when not in use, but will be automatically removed from the pathway of the cage when disposed in inoperative position.

Another object of the invention is to provide a simply constructed device which will be automatically released when the cage is elevated.

With these and other objects in view, the invention consists in certain novel features of construction as hereinafter shown and described, and then specifically pointed out in the claims; and in the drawings illustrative of the preferred embodiment of the invention, Figure 1 is a side elevation of a conventional mine cage and a portion of a mine shaft and level or "station" with the improvement applied;

Fig. 2 is a plan view of the cage shown in Fig. 1 and a sectional view of the station or level on the line 2—2 of Fig. 1;

Fig. 3 is an enlarged section of the eye bolt device which is attached to one of the timbers of the station;

Fig. 4 is a detached perspective view of the plate whereby the eye bolt is prevented from rotating.

The improved device comprises a bar, represented as a whole at 10, and adapted to be firmly attached to a mine cage, the latter being represented conventionally at 11. The bar 10 is secured to the cage by numerous rivets or bolts, indicated at 12, so that no danger exists of the bar being torn loose from the cage. At its upper outer end, the bar 10 terminates in a downwardly opening hook 13.

Secured to the face of one of the supporting timbers at each station or level of the shaft, is an eye-bolt 14. Generally the ceiling or roof of the station is supported by timbers, one of which is indicated at 15, and the nearest of these timbers is preferably utilized to support the eye-bolt. The body of the bolt passes through the timber 15 and is provided at the inner end with a washer 16 and a nut 17. Attached to the outer face of the post or timber 15 is a plate 18, and formed in the plate is a relatively long slot, indicated at 19, to receive the throat portion 20 of the eye-bolt 14 so that the eye-bolt will be held from turning when strain is applied to the holding nut 17. By this means, the eye bolt is rigidly supported in the timber and cannot be moved in either direction or rotated. Extending between the hooked terminal 18 of the bar 10 and the eye 14, is a flexible member, preferably formed of a plurality of chain links 21 with open hooks 22 at the ends. One of the hooks is designed to engage in the eye 14 while the other terminal hook engages the hooked terminal 13 of the bar 10, as illustrated in Fig. 1. The slot 19 is directed obliquely to the vertical plane of the plate 18, so that pull of the holding member is more nearly in line with longitudinal axis. By this simple means, the cage is supported with its tracks 23 in longitudinal alinement with the tracks 24 of the station or level, so that the mine car, not shown, may be run upon the tracks of the cage from the tracks of the station, or from the tracks of the station to the tracks of the cage without derailing the car.

The hoisting cables are relatively elastic and considerable stretching or lengthening of the cables takes place when the loaded cars are taken on or moved from the cages, particularly at the lower levels where the length of the cable under tension is greatest. This causes difficulty in moving the cars to and from the cages. In order to overcome this difficulty, the improved device herein illustrated has been devised. Many devices have been employed for holding the cages in position while the cars are being run thereon or removed therefrom, but these devices generally include portions which are liable to project into the pathway of the cage and cause accidents. With the present device no danger exists of the holding device projecting into the pathway of the cage when not in use, as when the car is moved upwardly or downwardly from the level or station, the holding device is automatically withdrawn into the interior of the station or level and will never, therefore, project into the pathway of the cage when not in use.

It will be noted that the hooked terminal 13 opens downwardly at all times, hence when the cage is moved upwardly, the hooked terminal 13 will be automatically removed from engagement with the hook 22 and permit the flexible holding member to swing downwardly upon its upper hook 22 and hang in parallel relation to the post 15 and be entirely withdrawn from the pathway of the cage. This is an important advantage in the present device and materially increases its efficiency and safety.

Having thus described the invention, what is claimed as new is:

1. A device of the class described comprising a bar adapted to be attached to a mine cage and formed with a downwardly opening hook, and a flexible element adapted to be attached at one end to a stationary portion of a mine shaft and detachably engaging the hook portion of the bar at the other end.

2. A device of the class described comprising an eye adapted to be attached to the stationary portion of a mine shaft, a bar having a downwardly opening terminal hook and adapted to be attached to a mine cage, and a connecting element having means at the ends for detachable engagement respectively with the eye and with the hook.

3. A device of the class described comprising a bar adapted to be attached to a movable structure and formed with a downwardly opening hook, and a flexible element adapted to be attached at one end to a stationary structure and detachably engaging the hook portion of the bar at the other end.

4. A device of the class described comprising an eye adapted to be attached to a stationary structure, a bar having a downwardly opening terminal hook and adapted to be attached to a movable structure, and a connecting element having means at the ends for detachable engagement respectively with the eye and with the hook.

5. A device of the class described comprising an eye and a bar adapted to be attached respectively to a stationary structure and a movable structure, said bar having a downwardly opening hook, and a connecting element having means at the ends for detachable engagement respectively with the eye and with the hook.

In testimony whereof I affix my signature.

WILLIAM H. PRICE. [L. S.]

Copies of this patent may be obtained for five cents each, by addressing the "Commissioner of Patents, Washington, D. C."